July 28, 1970     O. A. OPPERTHAUSER     3,521,842

SPRING CLAMP FOR MOUNTING CONDUIT ON A CHANNEL SUPPORT

Filed May 6, 1968

INVENTOR.
ORVAL A. OPPERTHAUSER
BY
Barnes, Kisselle, Raisch & Choate
ATTORNEYS

United States Patent Office 3,521,842
Patented July 28, 1970

3,521,842
SPRING CLAMP FOR MOUNTING CONDUIT ON A CHANNEL SUPPORT
Orval A. Opperthauser, Bloomfield, Mich., assignor to F. Jos. Lamb Co., Detroit, Mich., a corporation of Michigan
Filed May 6, 1968, Ser. No. 726,673
Int. Cl. F16l *3/04, 3/10*
U.S. Cl. 248—54       6 Claims

ABSTRACT OF THE DISCLOSURE

A one-piece spring steel wire clamp for attaching a conduit crosswise on opposed inwardly extending flanges along the free edges of a channel-shaped support member. The clamp is formed with two spaced saddle members integrally interconnected by a strut. Hooks are formed adjacent both the free ends and the strut ends of the saddle-shaped members to underlie and engage the inwardly extending flanges of the support member, thereby captivating a conduit between the flanges of the support and the saddle-shaped members.

---

Figure 7:
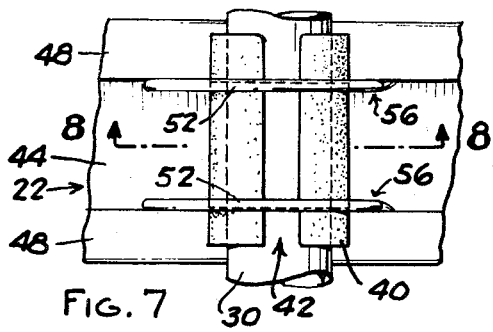

This invention relates to clamping devices and more particularly to a spring clamp for attaching a conduit to a support member.

Hydraulic and pneumatic lines, which are often associated with machines, machine tools, and the like, are subjected to vibration and occasionally severe shocks produced by sudden changes in the pressure of the fluid in the conduit. Where the conduits are supported directly on and run from machine to machine, the vibrations of the machine are transmitted to the conduit. The vibration of the conduit often causes the nut and bolt assembly of a conventional clamp to become loose so that the conduit is not properly attached to the support. Conventional clamps also rigidly attach the conduit to its support member so that it is not free to move slightly in response to severe shocks. The rigid attachment transmits the severe shocks from the conduit to the clamp and support member which subjects the clamp and support member to severe stresses. Over a prolonged period of use these severe stresses tend to damage the clamp or support member or both.

A principal object of this invention is to provide a device for clamping a conduit on a support member in which the magnitude of the clamping force is not subject to being substantially diminished by vibration of the device.

Another object of this invention is to provide a device for clamping a conduit to a support member which provides a slightly resilient mounting allowing the conduit to shift slightly with respect to the clamp and mounting member when it is subjected to a severe shock, thereby protecting the device, conduit and mounting member from being damaged.

Another object of this invention is to provide a device for clamping a conduit to a support member which can be rapidly and easily attached to and removed from the support member.

Another object of this invention is to provide a one-piece device for clamping a conduit to a support member.

Another object of this invention is to provide a device for clamping a conduit on a support member which can be formed by wire bending operations and hence is of economical construction.

Other objects and features of this invention will be apparent from the following description which discloses the manner of making, using and carrying out this invention in the best mode contemplated by the inventor.

In brief, this invention is a spring wire clamp for attaching a conduit crosswise on the free edges of a channel-shaped support member with inwardly extending flanges. Preferably, the clamp is a single piece of steel spring wire with a plurality of bends including a saddle portion overlying the conduit and hook portions extending on both sides of the conduit adapted to engage under the inwardly extending flanges of the channel-shaped support. The hooks on at least one side of the clamp are resiliently movable toward and away from each other to facilitate inserting the hooks between the inwardly extending flanges so that they can engage with the underside of the flanges.

Figure 1:
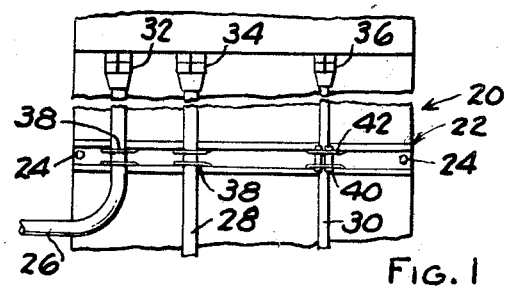

Drawings accompany this disclosure and the various views thereof may be described as:

FIG. 1, a fragmentary elevational view of a machine tool or other structure with hydraulic conduits attached to it.

Figure 2:
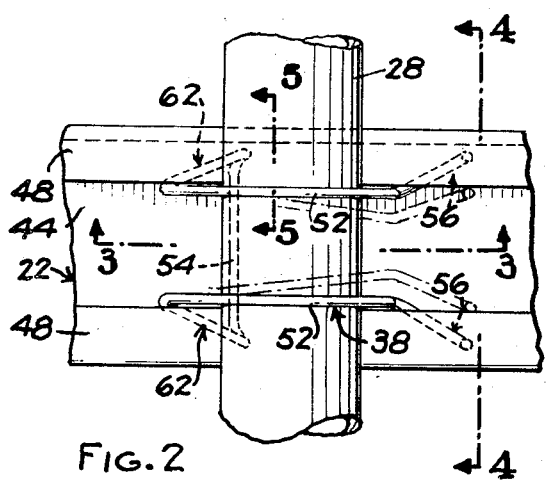

FIG. 2, a fragmentary elevational view of a conduit attached to a channel-shaped support member by the clamp of this invention.

Figure 3:
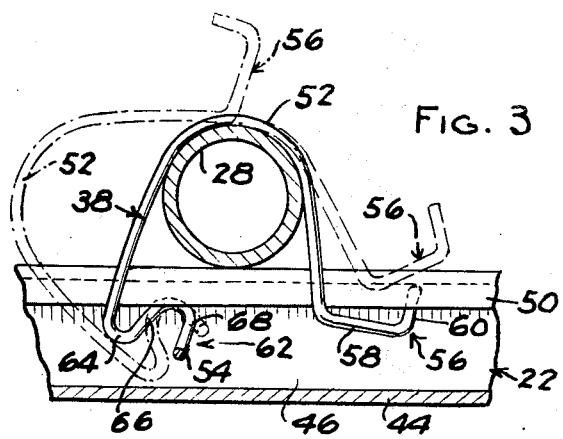
Figure 5:
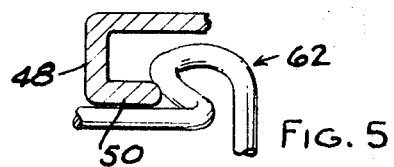
Figure 4:
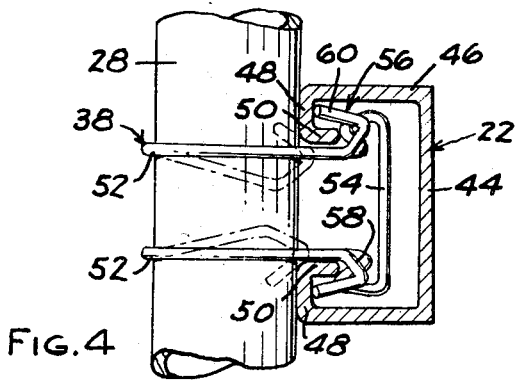
Figure 6:
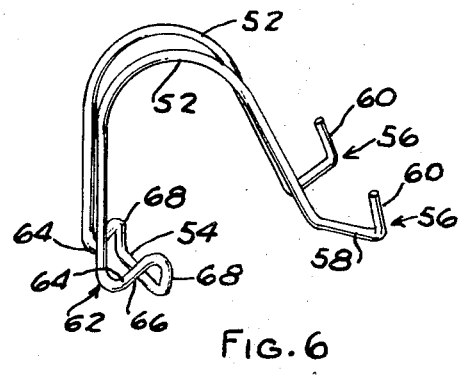
Figure 8:
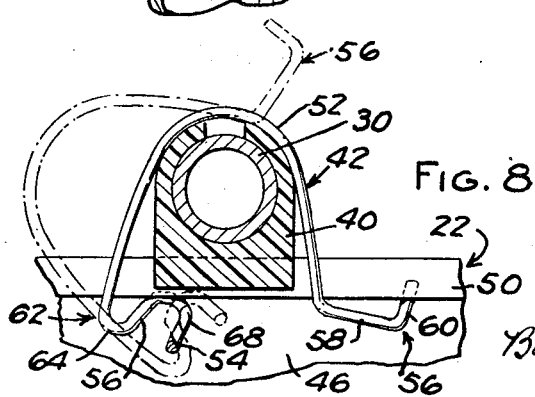

FIG. 3, a sectional view on line 3—3 of FIG. 2.
FIG. 4, a sectional view on line 4—4 of FIG. 2.
FIG. 5, a sectional view on line 5—5 of FIG. 2.
FIG. 6, a perspective view of the spring wire clamp.
FIG. 7, a fragmentary elevational view of a pad-supported conduit attached to a channel-shaped support member by the spring clamp.
FIG. 8, a sectional view on line 8—8 of FIG. 7.

Referring to the drawings:

In FIG. 1, a machine tool or other structure 20 with a channel-shaped support member 22 attached to it by screws 24 is shown. Hydraulic conduits 26, 28, and 30 lie crosswise on support member 22 and are coupled to machine tool 20 by suitable fittings 32, 34, 36. Conduits 26 and 28 are mounted on channel support member 24 by a spring clamp 38 and conduit 30 is mounted in a shock absorbing pad 40 which is attached to channel 22 by a spring clamp 42. The structure of shock absorbing pad 40 is fully disclosed in U.S. Pat. No. 3,370,815 issued Feb. 27, 1968.

As shown in FIG. 4, support member 22 is a generally U-shaped channel section with a base 44 and generally parallel side walls 46 terminating in inwardly extending flanges 48 and downwardly extending ribs 50. Flanges 48 provide a support surface for the conduit. As shown in FIG. 6, clamps 38, 42 are formed from a length of spring wire fashioned into two inverted U-shaped saddle members 52 which are interconnected at one end by a straight strut 54. The free lower ends of members 52 are formed into hooks 56 which include diverging bight portions 58 and upstanding end portions 60. The lower connected ends of saddle members 52 are formed into hooks 62 which include U-bends 64 with upwardly diverging legs 66. The upper ends of legs 66 are formed into return bends 68 and the latter are connected to the opposite ends of strut 54. The divergent relationship of hooks 56 and hooks 62 is best illustrated in FIG. 2.

As shown in FIGS. 2, 3 and 4, conduit 28 is attached crosswise on channel 22 by inserting hooks 62 in channel 22 and then turning clamp 38 so that saddles 52 are aligned with channel 22. Since strut 54 determines the spacing between hooks 62, proper dimensioning of the length of strut 54 with respect to the width of channel 22 assures that hooks 62 will engage the undersurface of flanges 48 (as shown in FIG. 5) when clamp 38 is turned to align saddles 52 with channel 22. Hooks 56 are then slid over conduit 28 so that they are on one side of conduit 28 and hooks 62 are on the opposite side of conduit 28. Hooks 56 are manually moved toward each other so that they can pass between flanges 48 as shown in FIGS. 2 and 4. The inherent resiliency of clamp 38 biases hooks 56 so that they will move outwardly away from each other once they are below the free edges of ribs 50 so that they will engage the undersurface of flange 48 (as shown in FIG. 4). As shown in FIGS. 7 and 8, clamp 42 can be inserted in channel 22 in a manner similar to clamp 38 to attach shock absorbant pad 40 and conduit 30 to support member 22. If pad 40 has an outer surface with a low coefficient of friction, hooks 56 are easier to slide over a conduit in pad 40 than over the surface of a steel conduit without a pad.

It should be noted that clamps 38, 42 derive their clamping force by being dimensioned so that they are slightly compressed or placed under tension when they are properly in place overlying a conduit with their hooks engaging the flanges of a support member. Vibration cannot adversely affect the clamping force developed by this device since it is a one-piece resilient spring steel structure that is placed under tension when it is placed over a conduit and inserted in a support member with inward flanges. Since the spring steel structure is inherently resilient, a conduit which is clamped to a channel support member by this device will be able to shift slightly with respect to the channel in response to severe shocks without adversely affecting the resilient clamp. Since this device is in one piece and hooks 62 are spaced so that they can be inserted under the flanges of a channel and hooks 56 are resilient so that they can be moved toward each other and inserted under the flanges on the other side of a conduit, this clamping device can be readily attached to and removed from a channel support member. Since this device is formed from a single piece of spring steel wire by a few simple bending operations, it is of economical construction when compared with devices which have several parts and usually require some sort of a nut and bolt assembly to develop their clamping force.

I claim:

1. A spring wire clamp for attaching a conduit crosswise on the free edges of a support channel having opposed inwardly extending flanges along its free longitudinal edge comprising, a length of wire having a pair of spaced similarly U-shaped saddle portions adapted to circumferentially overlie axially spaced portions of the conduit, each saddle portion comprising a pair of legs connected at one end by a bight portion, the other ends of one set of corresponding legs of the two saddle portions forming a first set of spaced apart, return bent wire hook members, means interconnecting said hook members and retaining them in said spaced apart relation such that when the clamp is inserted in the channel with the hook members spaced apart transversely of the channel the hook members underlie said flanges, the other ends of the other set of corresponding legs of the two saddle portions being freely flexible toward and away from each other and each comprising a return bent wire portion forming a second set of spaced apart hook members adapted to engage beneath said flanges on the opposite side of the conduit from said first hook members, said second set of hook members extending from said other ends of the other set of corresponding legs in laterally diverging relation.

2. A spring wire clamp as called for in claim 1 wherein the hook members of said first set each comprises two successive, reversely positioned return bends.

3. A spring wire clamp as called for in claim 2 wherein the fisrt return bend of each of the last-mentioned hook members opens toward the bight portion of its associated saddle portion and the second return bend opens in a direction away from the bight portion of its associated saddle portion.

4. A spring wire clamp as called for in claim 3 wherein the two successive return bends on each saddle portion extend in a direction generally transversely of the associated leg of the saddle portion in a direction toward the hook member on the other leg of the saddle portion.

5. A spring wire clamp as called for in claim 1 wherein said interconnecting means comprises a wire strut extending between the ends of the first set of hook members.

6. A spring wire clamp as called for in claim 3 wherein said interconnecting means comprises a wire strut extending between the ends of the second return bends of the last-mentioned hook members.

References Cited

UNITED STATES PATENTS

| | | | |
|---|---|---|---|
| 2,541,908 | 2/1951 | Attwood | 248—74 |
| 2,636,704 | 4/1953 | Norberg | 248—302 X |
| 2,674,431 | 4/1954 | Attwood | 248—73 X |
| 2,729,412 | 1/1956 | Amesbury | 248—68 |
| 2,918,240 | 12/1959 | Weigand | 248—71 |
| 3,266,761 | 8/1966 | Walton | 248—71 |

FOREIGN PATENTS 556,847  10/1943  Great Britain.

CHANCELLOR E. HARRIS, Primary Examiner

U.S. Cl. X.R.

248—72, 74, 302